_United States Patent Office_

3,652,471
Patented Mar. 28, 1972

3,652,471
POLYESTER AMIDE-IMIDE WIRE ENAMELS
Frank A. Sattler, Monroeville, Pa., assignor to Westinghouse Electric Corporation, Pittsburgh, Pa.
No Drawing. Filed July 28, 1969, Ser. No. 845,482
The portion of the term of the patent subsequent to Jan. 12, 1988, has been disclaimed
Int. Cl. C09d 3/66, 3/72
U.S. Cl. 260—22 R                  8 Claims

ABSTRACT OF THE DISCLOSURE

Economical wire enamels are made by cold blending a polyester-amide-imide of high amide-imide content with polyester of modest cost. Preferably, the composition also comprises an ester-urethane isocyanate as compatibilizing agent.

There are thus obtained wire-enamel formulations of low or modest cost that outperform the oil-modified acrylics in thermal life and the plain enamels (oleoresinous or synthetic oil-modified polyester) in several other properties.

BACKGROUND OF THE INVENTION

(1) Field of the invention

The invention relates to wire-enamel compositions, and in particular to ones of low or modest cost that exhibit a good combination of heat-shock resistance, solvent resistance, thermal stability in air, and resistance to hydrolytic attack, together with satisfactory properties as regards flexibility, abrasion resistance, and the like.

(2) Description of the prior art

Various wire-enamel compositions are known. These are usually sold in the form of a solution with about 20 to 40 weight percent solids content. There are relatively inexpensive ones that are used in applications where the encountered temperatures are not especially high and there is not much need for properties like abrasion resistance, toughness, solvent resistance, and heat shock resistance, etc., and there are more expensive ones that are used when better properties are required.

Among the inexpensive wire-enamel compositions are the polyester compositions made by the reaction of dimethyl terephthalate with glycerol and ethylene glycol (methanol is split out to yield the polyester). These compositions tend to lack the heat-shock resistance, abrasion resistance, heat stability, etc. that are required in many of the more stringent applications.

Somewhat better are the wire enamels based upon a blend of polyester with a polyester-amide-imide. It is known, for example, from British Pat. No. 996,649, to product an ester-imide resin of substantial imide content dissolved in an aggressive solvent such as a pehnol or the like. The patent goes on to teach the use of fatty acids as modifying agents in such resins, indicating that such fatty acids serve to improve the solubility of the product resin in solvents that are somewhat less aggressive, like benzene hydrocarbons. The patent further teaches that, in comparison with polyester resins that have been similarly modified with the use of fatty acids, the polyester-amide-imide resins have greater hardness, solvent resistance, and thermal stability.

From various work done in the making of polyester-amide-imide compositions, it is appreciated by those skilled in the art that the desired resin can conveniently be obtained by reaching a difunctional or higher-order organic alcohol, a difunctional or high-order organic acid compound, and a difunctional or higher-order organic amine compound. Other ingredients are worked in as necessary or desired. The prior art shows both the practice of merely putting together all of the reactants for subsequent heating to produce the desired resin and the practice of bringing individual ones of the components together beforehand to cause reaction therebetween and then subsequently blending or mixing the reaction products and causing a final reaction to yield the desired resin.

In the making of wire enamels, a great variety of materials have been taught as being useful as the acid component, or one of them if two or more are used, as is frequently done. The acid component may be an acid, anhydride or ester. Among the less expensive and more commonly mentioned acid components, there are dimethyl terephthalate, trimellitic acid anhydride, isophthalic acid, and terephthalic acid.

Among the more commonly used organic compounds containing at least two hydroxy groups, there are ethylene glycol, glycerol, pentaerythritol, trimethylolpropane, trimethylolethane, and 1,4-butanediol. Butanediol and ethylene glycol have two hydroxyl groups; glycerol and the trimethylol alkanes have three hydroxyl groups; and pentaerythritol has four hydroxyl groups. As those skilled in the art of compounding resins know, the use of a compound of greater functionality, such as glycerol or pentaerythritol, in greater amounts tends to yield a resin that is harder and more abrasion resistant, but at the same time less flexible and more difficult to dissolve in suitable solvents. The same holds true in general with respect to the use of an acid component of greater functionality. One polyol that has become readily available commercially in the recent past is tris(2-hydroxyethyl)-isocyanurate, a triol. This polyol has been described as a useful ingredient in the preparation of polyester-polyimide wire enamels in U.S. 3,426,098, which calls for compositions wherein at least 20% of the alcohol component is tris-(2-hydroxyethyl)-isocyanurate. This triol is a relatively expensive compound, and the compositions of the present invention use it sparingly, if at all. An object of the present invention is to provide a wire-enamel composition that exhibits a reasonably good combination of properties, despite the sparing use of this compound.

As the organic amino compound, there may be used according to the prior art such diamines or higher-order amines as methylene dianiline, oxydianiline, metaphenylene diamine, benzidine, and melamine.

In making polyester resins, it is also known to use as the catalyst to promote the condensation reaction a suitable substance such as cobalt naphthenate, zinc naphthenate, tetrabutyl titanate, or tetraisopropyl titanate.

In this art, it is also known that the properties of the resultant composition may frequently be improved by introducing as a part thereof a suitable amount of a compatibilizing agent in the nature of an ester urethane isocyanate, such as the reaction product of 3 mols of mixed 2,4- and 2,6-tolylene diisocyanate with trimethylolpropane, wherein the isocyanate groups are blocked by reaction with phenol (Mondur S), or the compound resulting from reaction with m-cresol of the reactive isocyanate groups of the mixed cyclic trimers of 2,4- and 2,6-tolylene diisocyanate. Other similar blocked isocyanates are known, and these tend to yield their compatibilizing effect by reacting with excess hydroxyl groups of a polyester or polyester-amide-imide. Although they are not reactive with the excess hydroxyl groups at room temperature, such end-blocked polyisocyanates become reactive at a moderately advanced temperature, such as 125° C., so that they lend their compatibilizing effect during the operation of curing the wire enamel.

The testing of a wire-enamel formulation involves numerous tests. These will be described briefly below, and their significance indicated.

In the baking-range test, a wire or conductor is coated with the wire-enamel formulation to a suitable thickness, such as 0.003 inch, by being repeatedly (for example, five or six times) passed through an applicator and then a 15-foot enameling tower at a hot-spot temperature of about 400° C., at various rates of speed. In the test, one seeks to determine both the lowest acceptable speed (one that provides a smooth coating that passes both a 1X Mandrel test and a Quick Snap test) and the maximum acceptable speed (one that yields a smooth, non-tacky coating). The 1X Mandrel test is passed if there is no crazing, cracking or other flaw development in the coating visible to the naked eye when the wire is wrapped around its own diameter.

The Quick Snap test involves placing the wire 12 inches long between the stationary chuck and a movable one, and elongating the wire rapidly so that the wire breaks at any distance more than 1 inch from either fastener. This test is passed if the enamel film is free of any flaws or imperfections when the wire to which it has been applied is so broken.

It is naturally desirable for the wire-enamel formulation to have a broad baking range and to be curable at a relatively rapid rate, such as 35 to 40 feet per minute on No. 18 AWG wire in tower of experimental size as mentioned above. In this regard, the known oleoresinous plain enamels usually exhibit a baking range such as 19 to 22 feet per minute on such wire in such a tower.

Known oil-modified acrylic wire enamels have a baking range something like 22 to 40 feet per minute. The known synthetic oil-modified polyester wire enamel formulations have a baking range substantially the same as the oleoresinous, about 17 to 22 feet per minute. The oleoresinous, the synthetic oil-modified polyester, and the oil-modified acrylic are the main known kinds of relatively low-cost wire-enamel compositions, for use in relatively non-stringent applications. The wire-enamel formulations containing a polyester-amide-imide or a polyester-amide are, for the most part, somewhat better in baking range, having a range such as 17 to 28 feet per minute or 17 to 36 feet per minute, but before the present invention, wire-enamel formulations containing polyester-amide-imide resin have been used for the most part for the relatively stringent wire-enameling applications, chiefly because they have required relatively expensive reactants and solvents.

The line speeds mentioned above are for an experimental-size 15-foot tower. In commercial practice, American Wire Gage No. 18 wire is usually enameled in a tower about twice as tall, using a line speed about twice as great. The line speeds used in commercial practice also vary with the size of the wire or conductor being enameled (slower speeds are used with larger cross sections of wire or conductor), but the figures given above for AWG No. 18 wire in a 15-foot tower represent fairly the relative performance of the materials discussed.

Another test conducted on wire-enamel formulations is the flexibility test. This is reported as the maximum percent elongation which the coated wire can be subjected to, still passing the 1X Mandrel test after elongation. In cotating No. 18 American Wire Gage wire, a flexibility value of 30% is excellent, since the underlying wire cannot be expected consistently to exceed that elongation without rupture. The known plain oleoresinous low-cost wire enamels tend to exhibit a value such as 5 to 15%; the synthetic oil-modified polyester resins, about 20%; and the oil-modified acrylics, over 30%. In coating larger rectangular conductors, however, it is sometimes necessary to achieve a flexibility beyond the maximum that can be tested for No. 18 American Wire Gage wire.

Another test is the Abrasion Resistance test. Although others are known, perhaps that most commonly used involves abrasion of the wire film with a cylindrical surface of a 16-mil diameter No. 11 needle, moved back and forth the distance of ⅜ inch at right-angles to the wire under a load of 700 grams. The value reported is the number of cycles required to cause the needles to break through the enamel film. Of the known resin materials of modest cost, the plain oleoresinous enamels give values like 2–3 in this test, but the oil-modified acrylics yield values of about 40. Values between 50 and 200 have been found for some of the relatively expensive wire-enamel formulations based on polyester-amide-imide resin.

Another test is the Heat Shock test, which is a measure of the ability of the enamel film to withstand heat while in a stressed condition. This is a condition that is encountered, for example, in heated wound magnet-wire coils. A length of enameled wire is wrapped around its own diameter twenty times. Each one of a series of test samples is placed in an oven at various increasing temperatures. The highest temperature which the stressed coils withstand after being heated for 1 hour and cooled to room temperature, without visible breaks or failures occurring in the enamel film, is considered the heat-shock value. The observations are made under a microscope at approximately 23 diameters magnification. Of the known resins of modest cost, the oil-modified acrylics are best in this property, having a value of about 250° C., as compared with values of about 100° C. for the plain oleoresinous enamels and the synthetic oil-modified polyester enamels. The polyester-amide-imide wire-enamel formulations seldom have heat-shock values higher than 275° C. The heat-shock values observed are more variable when the baking range is larger. Formulations baked less, at higher line speed, tend to give higher heat-shock values.

Another test is the Cut-Through test. This is a measure of the ability of an enamel film to resist flow under heat and pressure, such as is encountered in heated random-wound motor-armature coils. In this test, two enameled wires are placed horizontally and at right angles to each other in a suitable jig with a 1000-gram weight centered on the wires at the crossover point. The temperature of the assembly is raised at a constant rate of 5° per minute until the two conductors come into contact with each other, as is determined by means of electrical circuitry. The temperature at which this short circuiting occurs is considered the cut-through temperature value. This property is of relatively little importance where wire enamels are subject in use to only very mild service conditions. It increases in importance as the service conditions become more severe. Of the known kinds of low-cost wire-enamel formulations, the oleoresinous exhibits a cut-through value of about 180–200° C.; the synthetic oil-modified polyester is about the same; and the oil-modified acrylic yields cut-through values of about 200–220° C. For wire-enamel formulations intended for use at 130° C. or 155° C., maximum, cut-through values such as 220–300° C. are desirable. In the relatively costly polyester-amide-imide wire-enamel formulations, cut-through values over 400° C. have been observed.

Another test is the thermal-life test. This is a test measuring the expected thermal-class rating of varnished or unvarnished magnet wires in electrical equipment, and it is based on the theory of electrical-insulation deterioration treated as a chemical-rate phenomenon. The test procedure is that described in IEEE No. 57. Data is reported in terms of hours-to-failure at a given temperature. Of the known kinds of low cost wire-enamel formulation mentioned above, none give an average life at 200° C. as great as 500 hours. In this respect, the oil-modified acrylic wire-enamel formulations are especially disappointing, a life of 132 hours at 200° C. having been observed, versus about 250 hours for the oleoresinous. With formulations more expensive, values at 200° C. of over 30,000 hours have been observed. The foregoing values relate to the wire, used without varnish.

It is common to apply to the enameled wire a suitable varnish, such as one of the alkyd phenolic, silicone, isophthalate ester, or diphenyl-oxide-polymer type. The effect of the varnish on the thermal life is somewhat unpredictable. Some systems are surprisingly incompatible, yielding thermal lives far lower than expected. In general, when the thermal life of the unvarnished enameled wire is poor, the thermal life of the varnished is longer. In many instances, when the thermal life of the unvarnished wire is rather good, the varnish lessens the thermal life substantially, up to about 30–50%. It is desirable, of course, that a wire-enamel formulation exhibit good compatibility with a wide range of varnishes.

In a wire-enamel formulation, and particularly in one of modest cost and properties, the selection of an appropriate solvent is important. Although benzene and its homologs, toluene and xylene, are relatively inexpensive, so that there is a considerable incentive to use them for modest-cost enamel-wire formulations, these solvents tend to lack the aggressive solvent power that is required to dissolve the polyester-imide and polyester-amide-imide resins. Accordingly, it has generally proved necessary to use a more aggressive solvent, such as phenol, o-cresol, m-cresol, p-cresol, or the isomeric mixture of the cresols referred to as "cresylic acid." These solvents are more expensive, and the necessity for using them has caused those skilled in the art to look away from the polyester-imide and polyester-amide-imide resins as suitable for use in modest-performance wire-enamel compositions. Attempts have been made, as indicated in the above-mentioned British patent, to modify the polyester-imide resins by reaction with fatty acids, such as tall-oil fatty acids, in the hope of making them compatible with benzene hydrocarbons, but it has been found that this approach, in general, causes a sufficient deterioration of the properties of the wire-enamel formulation, particularly as regards hardness and toughness, that the resulting baked enamel coatings do not have properties substantially more promising than those of the known kinds of low-cost wire-enamel formulation.

BRIEF SUMMARY OF THE INVENTION

Somewhat surprisingly, it has now been found that novel enamel-wire formulations based on polyester-amide-imide resins and the aggressive but somewhat expensive solvents can be made that exhibit properties comparing favorably with the known wire-enamel formulations of modest or low cost, yet because of the relatively inexpensive reactants used and their compatibility with less costly ones of the phenolic solvents, these novel formulations are likewise of low or modest cost. The inventive compositions are made by blending a polyester-amide-imide composition with at least a polyester composition and preferably with also a compatibilizing agent of the class of the phenol- or cresol-end-blocked polyisocyanates of high molecular weight. The polyester-amide-imide composition is based upon trimellitic anhydride, ethylene glycol, and methylenedianiline or, to some extent, equivalent materials. The polyester composition is based upon trimellitic anhydride, isophthalic or terephthalic acid or esters thereof, and ethylene glycol, although to some extent equivalent materials may be used. Certain novel end-blocked polyisocyanates, containing an ester linkage and useful in the making of these and other enamel-wire formulations are also taught. There result from this invention enamel-wire formulations of modest cost that surpass the low-cost oil-modified acrylics in thermal life and constitute a great improvement over the plain enamels of the oleoresinous or the synthetic oil-modified polyester type in baking range, heat shock, flexibilty and abrasion resistance. At the same time, these novel compositions have properties in other respects at least rather closely approaching if not surpassing, those of the oil-modified acrylics. The novel formulations, in short, provide properties of a wire enamel for use at 155° C. or even 180° C., but at a cost about that of the formulations now known and used for applications at 155° C., 130° C., or even 105° C. The keys to this result lie in the selection of the reactants, of the reactant proportions (both within the making of a blend ingredient and between the blend ingredients), and of solvents, and the adoption of a practice of cold-blending polyester-amide-imide material with polyester material and, if desired or necessary, end-blocked polyisocyanate compatibilizing agent, whereby there are obtained formulations retaining to a desirable extent both the flexibility imparted by the polyester and the heat-shock resistance and the superior thermal life values imparted by the amide-imide.

DESCRIPTION OF THE PREFERRED EMBODIMENTS

The novel enamel-wire formulations of this invention are made by blending a polyester-amide-imide composition with a polyester composition.

POLYESTER-AMIDE-IMIDE

The polyester-amide-imide composition to be used is one of relatively high amide-imide content. In making it, it is necessary to use 15–30 equivalent percent of methylenedianiline, except that up to 50% of the methylenedianiline may be replaced with other diamino compounds such as m-phenylenediamine, oxydianiline or melamine. If the amide-imide content of the polyester-amide-imide composition used is not sufficiently high, the improvement in properties over ester-type wire enamel is insufficient. Poorer values in heat shock and/or thermal stability may be expected. On the other hand, if the amide-imide content is too high, the wire enamel tends to become too inflexible in the cured state and in some instances, difficulty is encountered in maintaining the polymer in solution. A replacement of the methylenedianiline with melamine must not be carried too far, since the flexibility tends to suffer. With m-phenylenediamine, the use of increasing quantities tends to increase the cost. Those skilled in the art will appreciate that any of many other polyamines, preferably aromatic amines, might find use as equivalents for the particular materials mentioned above so far as their chemical properties are concerned, but in almost all instances the use of these other materials is ruled out on account of cost.

The polyester-amide-imide composition necessarily contains an acid component. According to this invention, that component constitues from 40 to 52.5 equivalent percent and is preferably supplied by using trimellitic anhydride, to an extent of 20–50 equivalent percent of the polyester-amide-imide composition. Trimellitic anhydride possesses a fortunate combination of a desirable degree of functionality with cost sufficiently modest to indicate its use to achieve the ends of the present invention. Those skilled in the art will preceive that there are few organic acids that will perform chemically the same as the trimellitic anhydride. Trimellitic anhydride has both an anhydride group that will react readily to form imide linkages and a carboxyl group that will react somewhat less readily to form ester or amide linkages. This makes the compound ideally suited for producing a polymer with a limited number of imide linkages, along with some amide and ester linkages. It is important to limit the number of imide linkages because as the incidence of imide linkages rises, the polymer tends to become (though somewhat stronger) more difficult to dissolve. Accordingly, dianhydrides such as pyromellitic dianhydride or benzophenonetetracarboxylic dianhydride are not satisfactory substitutes for the trimellitic anhydride. If available at reasonable cost, another aromatic or carbocyclic compound with both a single reaction acid-anhydride group and a single carboxyl group might be used in place of the trimellitic anhydride, but no such compound is now known to the applicant. The use of a substantial amount, 20 to 50 equivalent percent, of trimellitic anhydride in the polyester-amide-imide composition, must be considered eseential. I find, however, that it is not necessary that all of the acid present in the composition be composed of trimellitic anhydride; there are relatively inexpensive fatty acid compositions that can be tolerated in the polyester-amide-imide composition to the extent of up to about 10 equivalent percent. In other words, I may use unsaturated aliphatic acids that contain 15–20 carbon atoms per molecule, with typical examples being oleic acid, linoleic acid, elaidic acid, and the like. Mixtures of such acids are available commercially and constitute the preferred aliphatic acids used in this invention, if they are used. In this regard mixtures of linoleic and oleic acids are commercially available as "tall-oil fatty acids," comprising generally about 85–99% of the mixture sold commercially under that name. Linseed fatty acids or soya fatty acids may similarly be used.

I find, moreover, that the cost of the wire-enamel formulation is somewhat lowered and the properties are not unduly impaired if there is used, as part of the acidic component of the polyester-amide-imide composition, 0–15 equivalent percent of isophthalic acid or dimethyl terephthalate. Lower-alkyl ($C_1$ to $C_5$) esters of the isophthalic acid may be used, as may other lower-alkyl esters of terephthalic acid or terephthalic acid itself, though the acid itself is rather difficult to react with known catalysts and procedures. The substitution of isophthalic acid or dimethyl terephthalate for trimellitic anhydride provides one way of controlling the "functionality" of the wire-enamel formulation. As respects the formation of amide or ester linkages, trimellitic anhydride is trifunctional, where isophthalic acid and dimethyl terephthalate are difunctional. Satisfactory formulations can be made with the use of the trimellitic anhydride alone, but to the extent that one or both of the other two compounds are substituted, the polymer produced tends to become more nearly linear and, while more flexible and more readily soluble in solvents less aggressive, at the same time less abrasion-resistant and strong. Replacing all of the trimellitic anhydride with dimethyl terephthalate or isophthalic acid is, of course, outside the scope of the invention because the anhydride group is needed for the formation of imide linkages.

The polyester-amide-imide composition also contains an alcohol component. It may, for example, comprise 20–35 equivalent percent of ethylene glycol. Ethylene glycol is relatively inexpensive, and its low degree of functionality tends to make the polymer linear, leading to good solubility and flexibility but tending to leave the abrasion resistance and cut-through value rather low. At the expense of a modest sacrifice in flexibility and with a rather slight increase in cost, the alcohol component can be made to comprise up to 15 equivalent percent of a triol such as glycerol or one of the trimethylol alkanes containing about 5–7 carbon atoms. One of the $C_3$ to $C_5$ alpha-omega-alkane diols may be used in place of the ethylene glycol, but this is contraindicated on account of cost.

It is generally desirable, for reasons that will be discussed in greater detail below in connection with the polyisocyanate compatibilizing agent, to use a polyester-amide-imide composition that has at least a few excess hydroxyl groups. In other words, it is desirable that the acid components not amount as a rule to more than 50 equivalent percent, and will be satisfactory if the alcohol components plus the diamine amount between 40 and 60 equivalent percent, preferably over 50%. The range on the alcohol component is dictated in part of the need for including in the composition enough of the diamine component to obtain a satisfactory improvement in properties, but not so much as to cause the difficulties mentioned above as developing when the amide-imide content is too high.

In the foregoing, repeated reference has been made to the term "equivalent percent." The "equivalent percent" is employed herein as calculated according to the formula:

Equivalent percent of ingredient equals $$\frac{\text{Number of mols of ingredient} \times \text{functionality of ingredient}}{\Sigma \text{ (Number of mols of ingredient} \times \text{functionality of ingredient)}} \times 100$$

All ingredients which have reactive groups are considered in the sum ($\Sigma$) which serves as the divisor in the formula, whether already reacted in the soluble coating composition or available for reaction when cured on the electrical conductor. The functional groups are the anhydride, carboxyl, hydroxyl, amino, titanate, ester and isocyanate groups. The dicarboxylic acidic compounds, dihydric alcohols and diamines are bifunctional. The functionality of the other polyols is determined by the number of hydroxyl groups present. Trimellitic anhydride should be considered trifunctional in the polyester reaction (with the polyols) but bifunctional with the amide-imide reaction (with the amine). The anhydride group is monofunctional in imide formation. From the calculations, the functionality of trimellitic anhydride the reaction with the diamine should be calculated on the basis that all of the possible imidization occurs first (with the anhydride group) and that the remaining carboxyl groups of the trimellitic anhydride are reactive with amino groups to form amide linkages and then hydroxyl to form ester linkages.

The polyester-amide-imide composition also contains 0–3 equivalent percent of a catalyst selected from the group of tetraisopropyl titanate, tetrabutyl titanate, lead acetate, and zinc naphthenate.

SOLVENTS AND DILUENTS

The above-indicated reactants are brought together in a system that also contains a suitable solvent, alone or with one or more suitable diluents. It should be borne in mind that the solvent is not necessarily one that is liquid at room temperature or one that is completely unreactive as respects the reactant components present. For example, the necessary reactions (at about 150–250° C.) can be made to occur in the presence of phenol, which is solid at room temperature but melts below the reaction temperature range and then forms with the polymer made by the reaction a solution that remains liquid at room temperature. Moreover, the phenol is a monofunctional hydroxyaromatic compound, and thus it is to some extent capable of reaction with acidic components present in the reaction mixture. The same is true of other "solvents." I prefer to use "cresylic acid," which is an isomeric mixture of cresols (monomethyl phenols) along with some xylenols, i.e., dimethyl phenols. The cresylic acid is attractive because of its aggressive solvent powers and relatively low cost. Somewhat more expensive are the cresol mixtures, such as the fraction of cresylic acid from which the xylenols and the o-cresol have been removed, namely, the fraction called "m-, p-cresol." O-cresol may be used, or m-cresol or p-cresol alone, or different ones or mixtures of the xylenols, alone or with others of the compounds mentioned above.

A suitable solvent may, of course, be used alone, but in most circumstances it is desirable to reduce the cost of the wire-enamel formulation by using a substantial portion, up to 60 weight percent, of a diluent, namely, a compound or mixture of compounds that, although not itself or themselves of such great solvent power as to be useful alone, will serve satisfactorily to extend and tend to liquefy the component or wire-enamel formulation being made. The diluent may, so far as chemical considerations alone are concerned, be any of a great number of compounds, singly, or in admixture, the chief requirements being that the diluent have a suitable liquidus temperature range (about 50 to 200° C.) and be substantially unreactive with the desired chemical reactions to be effected. Various aliphatic and carbocyclic hydrocarbons, esters, aldehydes, alcohols, etc. suggest themselves as suitable for complying with the above requirements. Considerations of air pollution and the other practicalities of enameling-tower operation will dictate in most instances a somewhat more stringent selection. Good results are obtained with the use of a hydrocarbon fraction of aliphatic nature boiling at 161–177° C. under 1 atmosphere of pressure, such as that sold commercially under the name "Solvesso 100," or the similar cut boiling at 187–211° C., sold commercially under the name "Solvesso 150."

REACTION

Having indicated above the components that are to be used in making the polyester-amide-imide composition, it remains to describe the manner of reacting them to obtain a suitable polymerized composition of this kind for use in this invention. It is not wise, or even practical, merely to combine all the above-indicated ingredients with a suitable quantity of solvent and heat to cause reaction among them. If this is attempted, the first reaction occurring is the one between the anhydride and the diamine, and it proceeds promptly to the formation of imide linkages, yielding a polyimide that is difficult to solubilize. Instead, appropriate ones of the above-mentioned ingredients in appropriate amounts are mixed with a solvent, alone or with a diluent, as discussed above, and a condensation reaction is conducted to yield a polyester. In general, it suffices to heat the reaction mixture for making the polyester rapidly to a temperature such as 160° C. and then at a slower rate, such as about 15° C. per hour, to a temperature more elevated, such as 220° C., thereby obtaining a polyester of approximately thread-forming viscosity. The amine component is then added, and the remainder of the trimellitic anhydride, alone or with some additional of the alcohol component, is added slowly. By proceeding in this manner, it is possible to obtain imide linkages as well as amide linkages, without having the imide linkages generate an insoluble polymer.

In the foregoing description, perhaps sufficient emphasis has not been placed upon the importance of selecting appropriate quantities of the various reactants to obtain a reaction mixture that is suitably stoichiometrically balanced. In making the polyester-amide-imide composition, the equivalent percent of polyols plus the equivalent percent of the amino components minus the equivalent percent of the acidic components should equal between —5% and 20%, being preferably about 0 to 10%. A slight excess of polyol is desirable, especially if a compatibilizing agent is used. When the range indicated above is departed from, the procedure tends to become uneconomical because of inefficient use of reactants, excessive stack losses in the enameling tower, etc.

POLYESTER

Turning now to the polyester composition that is made for use in this invention, this comprises acid, alcohol, and catalyst components.

The acid component of the polyester composition comprises 40–55 equivalent percent of a compound selected from the group consisting of isophthalic acid and its $C_1$ to $C_5$ esters, trimellitic acid and its anhydride and its $C_1$ to $C_5$ esters, and terephthalic acid and its $C_1$ to $C_5$ esters. The preferred compounds are isophthalic acid, trimellitic anhydride and dimethyl terephthalate. These may be used singly or in desired combinations. In making the polyester, the use of trimellitic anhydride is not necessary, except to the extent that it may prove desirable to include it to obtain adequate functionality for the particular application intended for the wire-enamel formulation to be made. This means that for the mildest applications, where low cost of the formulation is especially desired, the trimellitic anhydride is omitted.

The alcohol component of the polyester composition amounts to 40–60 equivalent percent thereof. It comprises at least 10 equivalent percent of a diol, preferably ethylene glycol but possibly one of the other diols mentioned above in connection with the polyester-amide-imide composition. The diol may amount to as much as 60 equivalent percent of the polyester composition. The polyester composition may also contain 0–50% of a triol, preferably glycerol. Other triols as mentioned above in connection with polyester-amide-imide composition may also be used. As with polyester-amide-imide composition, the use of triols rather than diols tends to increase the thermal properties and lower the flexibility and increase the cost. Triols are use to the extent that these effects are desired or can be tolerated.

Particular mention should also be made of the possibility of using tris-(2-hydroxyethyl)-isocyanurate as a triol, in the polyester composition or in the polyester-amide-imide composition. It is generally preferred, from considerations of cost, to omit the tris-(2-hydroxyethyl)-isocyanurate, but in instances in which improved properties are required and an increased cost can be tolerated, it will be possible to use the tris-(2-hydroxyethyl)-isocyanurate in an effective amount, such as over about 5 equivalent percent, and up to about 15 equivalent percent.

With the polyester composition, the teachings concerning catalyst are the same as with the polyester-amide-imide composition.

The manner of making the polyester composition is familiar to those skilled in the art. The ingredients are heated together at a suitable elevated temperature, or possibly, all or part of one or more of them is reserved for slow addition during a period of heating at temperatures in the general range of 100–250° C. The condensation reaction is permitted to continue to a desired extent, such as the reaching of a ball-and-ring softening temperature of about 85–120° C. The solvents used are as indicated above in connection with the polyester-amide-imide composition, and a final step in the production of the polyester composition is the dilution of the polymer, if necessary, with a solvent to adjust its viscosity appropriately. A viscosity on the order of 5–10 poises at 25° C. is satisfactory.

COMPATIBILIZING AGENT

A third component, which may or may not be used for blending with the polyester-amide-imide component and the polyester component discussed above, comprises an end-blocked polyisocyanate of substantial molecular weight, over 500. One such known compound, which may be used in accordance with this invention, is the reaction product of 1 mol of trimethylolpropane with 3 mols of tolylene diisocyanate, end-blocked with 3 mols of phenol, known comercially as "Mondur S." Another is the cyclic trimer of tolylene diisocyanate, end-blocked with metacresol, and known commercially as "Mondur SH." Still others are novel compounds made in accordance with this invention, comprising (a) the reaction product of 1 mol of dimethyl terephthalate with 2 mols of ethylene glycol and 2 mols of tolylene diisocyanate, end-blocked with cresylic acid and (b) the reaction product of 2 mols of dimethyl terephthalate and 3 mols of ethylene glycol with 2 mols of tolylene diisocyanate, end-blocked with cresylic acid. The corresponding compounds, made using isophthalic acid in place of dimethyl terephthalate are also believed novel and may also be used. These novel compounds are characterized by containing ester linkages and being somewhat greater in molecular weight than the ones indicated above as being known. It will be seen that the novel compatibilizing agents are made by reacting $n$ mols of terephthalate or isophthalic with $n+1$ mols of ethylene glycol (or other lower-alkyl $C_2$ to $C_4$ alpha-omega diol), then reacting the product of that reaction successively with tolylene diisocyanate and then phenol, a cresol or a xylenol to achieve end-blocking. There is thus obtained a compound having the formula

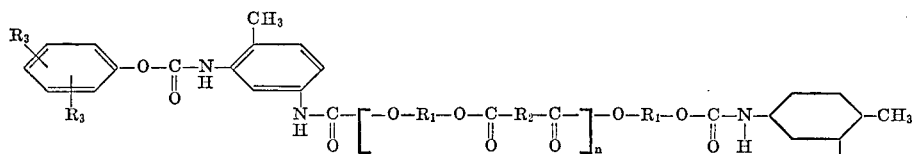

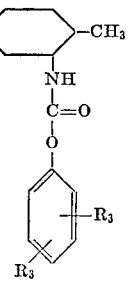

where $n$ is an integer from 1 to 3, $R_1$ is selected from the group consisting of

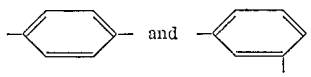

$R_2$ is selected from the group consisting of $$-CH_2-CH_2-$$
$$-CH_2-CH_2-CH_2-, \text{ and}$$
$$-CH_2-CH_2-CH_2-CH_2$$

and $R_3$ is selected from the group consisting of hydrogen and methyl.

The reaction of these compounds, when blended with the polyester-amide-imide composition and the polyester composition to produce a wire-enamel formulation, is such that, because of the end-blocking effect of the phenol or cresol, no reaction takes place between the compatibilizing agent and the excess hydroxyl groups at room temperature, but at a moderately elevated temperature such as 125° C., the end-blocking reaction of the phenol or cresol becomes ineffective, and the compatibilizing agent then reacts with excess hydroxyl groups in the polyester or polyester-amide-imide components of the blend, thereby compatibilizing them. With compounds of this kind, high molecular weight is exceedingly desirable, as it tends to lessen the weight losses experienced by the formulation during the severe tower baking conditions at high temperatures.

The manner of making the novel compounds mentioned above will be apparent to a person of ordinary skill in the art, once that he knows the reactants that are to be used. The starting acid or ester and glycol are mixed in appropriate stoichiometric quantities in a suitable solvent, and for this purpose, it is desirable to use cresylic acid, since it will later take part in the reaction. After appropriate heating and removal of water or methanol, the esterification is complete and the appropriate stoichiometric quantity of tolylene diisocyanate may be added, possibly in the form of a solution in cresylic acid. Further heating then completes the reaction.

BLENDING

Having made, as described above, a polyester-amide-imide composition and a polyester composition (and possibly also a compatibilizing-agent composition), the next step in the practice of the invention is to blend these components, e.g., at about room temperature, to obtain a soluble wire-enamel formulation. In doing this, one mixes the above-indicated two or three blend components in suitable proportions. The polyester-amide-imide composition is used in such amount that it contributes 20–70 parts by weight on a solids basis of the final wire-enamel formulation. The polyester composition is used in such amount that it contributes 80–20 parts by weight on a solids basis of the final wire-enamel formulation. The compatibilizing agent contributes 0–40 parts by weight, on a solids basis, of the final formulation.

The exact amounts to be used of the blend components will depend upon their composition and the intended use. In general, using more of the polyester-amide-imide composition will give better properties (except possibly in flexibility) but will increase the cost. When the polyester-amide-imide composition is relatively low in amide-imide content, it will ordinarily be necessary to use more of it and correspondingly less of the polyester composition and, if used, a compatibilizing agent, in order to obtain a formulation that will exhibit a predetermined combination of desirable properties. On the other hand, when the amide-imide content of the polyester-amide-imide composition is high, less may be used.

The proportions to be selected in the blending of the components will also be influenced by the degree of functionality of the individual components. If the polyester-amide-imide composition contains considerable proportion of a triol, it will ordinarily be desirable to use a little less of it and more of the polyester composition (provided that it is not also high in triol) so that there will be obtained a material with adequate flexibility. Of course, for an application in which flexibility is not important and thermal resistance is important, there would be used a wire-enamel formulation with a substantial amount of triol in both polyester-amide-imide and the polyester, and where cost considerations would permit, more of the polyester-amide-imide would be used. Increasing the polyester composition content of the blend usually lowers the cost and improves the flexibility, but the heat-shock resistance, solvent resistance and thermal life are, in general, somewhat worsened when this is done. Moreover, the use of triols vs. diols is not the only factor that affects functionality; the use of trimellitic anhydride vs. isophthalic acid and/or dimethyl terephthalate in either the polyester-amide-imide composition or the polyester composition, or both, has its corresponding effect. Similarly, the use of melamine in place of one of the diamines adds to the functionality of the polyester-amide-imide material. The usual practice is to use, in general, a combination of blend components that is, all things considered, just high enough in functionality to provide the desired properties, since in most instances, the more functional material is also somewhat higher in cost. In this connection, it is noteworthy that pentaerythritol is tetrafunctional and reasonably inexpensive; those skilled in the art will perceive that it might be reacted with 0.5 to 2 mols of inexpensive long-chain fatty acid to block some of its hydroxyl groups, reducing its functionality to a usable level, and then incorporated in a composition in accordance with this invention.

The soluble wire-enamel compositions of this invention, made as described above, may be used alone, with blending in any additional ingredients. For some purposes, however, there may be included additional ingredients, such as up to about 1 weight percent on a contained solids basis of a metallic-drier or a different resin, such as a melamine-formaldehyde resin or a phenolic resin such as phenol formaldehyde, cresol-formaldehyde, or xylenol-formaldehyde in such amounts as up to about 10 weight percent on a contained solids basis.

The compatibilizing agent when used, will increase the cost but will also tend to improve the properties, so that its use is especially to be recommended if the abrasion resistance is important. It may be used in amounts from 10 to 40 parts by weight on a contained solids basis.

Although for simplicity the invention is hereinabove disclosed and hereinbelow illustrated as involving the blending of two or three compositions, each of different type, those skilled in the art will see that there may be times when it is desirable to use, for example, two or more different kinds of polyester, or of polyester-amide-imide, or of compatibilizing agent. This practice is likely to be used in the making from a number of starting materials of predetermined composition a number of different wire-enamel formulations of differing cost and performance. With, for example, (1) a polyester-amide-imide of lower amide-imide content, (2) a polyester-amide-imide of higher amide-imide content, (3) a relatively non-functional polyester, (4) a relatively functional polyester, (5) a polyester with a substantial content of tris - (2 - hydroxyethyl) - isocyanurate and (6) a compatibilizing agent, it will be possible to make an entire range of suitable compositions of low to moderate cost and performance, ranging from one very inexpensive, containing about half each of (1) and (3), to one rather costly, containing perhaps 35% of (2), 30% of (4), 20% of (5), and 15% of (6).

USING

The manner of using these wire-enamel formulations is one known to those skilled in the art. A wire or conductor is coated therewith by dipping, spraying, or other suitable method, to produce on the conductor or wire a coating of suitable thickness, such as 0.002 to 0.005 inch with successive coatings, each followed by heating to cause curing of the enamel composition. This is ordinarily done in suitable continuously operating equipment, such as a 15-foot enameling tower operating at a hot-spot temperature on the order of 400° C. with a line speed of about 20 to 40 feet per minute, depending upon the characteristics of the wire-enamel formulation used. The enameled wire may then be varnished, using one of the various kinds of varnish indicated hereinabove, and then used in various ways, as known to those skilled in the art, including winding onto a core with the use of automatic machinery.

EXAMPLES

The invention described above is illustrated by the following examples:

EXAMPLE I

Into a four-necked-reaction flask, equipped with a heater, motor stirrer, nitrogen sparge tube, thermometer and air condenser, there were charged the following reactants in the quantities indicated:

| | Mols |
|---|---|
| 155.2 grams of ethylene glycol | 2.5 |
| 68.5 grams of trimellitic anhydride | 0.357 |
| 89 grams of isophthalic acid | 0.535 |
| 300.0 grams of tall-oil fatty acids | 1.07 |
| 21.0 grams of tetraisopropyl titanate | 0.0739 |

The reactants were heated approximately to 160° C., and then at a rate of 15° C. per hour to a temperature of 220° C. Then there was added to the reaction mixture a quantity of methylene dianiline, 331.0 grams or 1.668 mols. Slowly, over a 1-hour period, with the reaction mixture being maintained at 170–190° C., there were added 428.7 grams, or 2.23 mols, of trimellitic anhydride. After an additional 1.5 hours of heating at 205° C., 70.2 grams of trimellitic anhydride (0.365 mol) were added, and the reaction was heated a further 0.5 hour at 190° C. Then 98.2 grams of trimethylolpropane (0.730 mol) were added, and the reaction mixture was heated at 190–205° C. for 3.5 hours. There was thus produced a resinous material, which was then diluted with 600 grams of cresylic acid and 100 grams of "Solvesso 100." There was thus obtained a solution weighing 2758 grams and having a non-volatile content of 40.6%, as determined by testing 1 gram of solution in a two-inch diameter aluminum dish for ½ hour at 200° C. There was thus made a polyester-amide-imide composition in accordance with the teachings of this invention. For convenience, this composition will be hereinafter referred to as Composition A.

To a 5-liter, 4-necked reaction flask equipped with a stirrer, nitrogen sparge tube, thermometer and a condenser, there were added the following reactants in the quantities indicated:

| | Mols |
|---|---|
| 144.4 grams of ethylene glycol | 16.8 |
| 768.4 grams of trimellitic anhydride | 4.0 |
| 12.0 grams of isopropyl titanate | 0.0422 |

The reaction mixture was heated to 125–125° C., and 1328.8 grams of isophthalic acid, 8.0 mols, was added slowly over a 30-minute period. The reaction mixture was then heated rapidly to 160° C., and then slowly at 15° C. per hour to 225° C., being held at the latter temperature until a ball-and-ring softening temperature of 140° C. was reached. Then, 2400 grams of cresylic acid and 1730 grams of "Solvesso 100" were added. The yield was 6690 grams of solution at 38.5% solids. In this manner, there was made a polyester composition in accordance with the teachings of this invention. For convenience, this composition will be referred to hereinafter as Composition B.

Then 443 grams of Composition A were blended with 1092 grams of Composition B. This amounted, on a solids basis, to the use of 30 parts by weight of Composition A and 70 parts by weight of Composition B. The resultant blend solution was then thinned to 36% solids and a viscosity of 8.5 poises at 25° C., with the use of 132 grams of a solvent mix consisting of cresylic acid and "Solvesso 100" in proportions of 1:1. This formulation was then coated onto No. 18 American Wire Gage copper wire in a 15-foot vertical enameling tower at a hot spot temperature of 400° C., with a build of 3.1 to 3.5 mils. The enameled wire was tested for baking range, flexibility, abrasion resistance, heat shock, cut-through, and thermal life, with the thermal life determinations being done with no varnish, an alkyd-phenolic varnish, silicone varnish, an isophthalate-ester varnish, and a diphenyl-oxide-polymer varnish. The results of these tests are indicated below in Table I.

EXAMPLE II

A blend was prepared using 887 grams of Composition A and 623 grams of Composition B. This amounted to the use of 60 parts by weight of the polyester-amide-imide composition and 40 parts by weight of the polyester composition, both on a contained-solids basis. The blend solution was diluted to a viscosity of 6.7 poises at 25° C. with the use of 187 grams of "Solvesso 100." Coatings were then made on No. 18 American Wire Gage copper wire in the manner defined in Example I, and tests were conducted as indicated in Example I, except that the thermal life tests were limited to work with unvarnished specimens. The results are indicated below in Table I.

EXAMPLE III

To a 3-liter, 4-necked reaction flask equipped with inert-gas sparger, motor stirrer, thermometer, and a short air condenser, there were charged the following ingredients in the quantities indicated:

|  | Mols |
|---|---|
| 155.2 grams of ethylene glycol | 2.5 |
| 68.5 grams of trimellitic anhydride | 0.535 |
| 89.0 grams of isophthalic acid | 0.535 |
| 300.0 grams of tall oil fatty acid | 1.07 |
| 21.0 grams of tetraisopropyl titanate | 0.739 |

The reaction mixture was heated rapidly to 160° C., and then slowly under a rate of 15° C. per hour, from 160° C. to 220° C., being then held at the latter temperature for 1 hour. At this point, 600 grams of cresylic acid were added, along with 331.0 grams of methylene dianiline (1.668 mols), and then 428.7 grams of trimellitic anhydride (2.23 mols) was added slowly over a period of 1 hour, with the reaction mixture being maintained at a temperature of 175–185° C. The reaction was permitted to continue at a temperature of 190–220° C., increasing at 15° C. per hour, and the mixture was then held at 220° C. for 5 hours. At this point, the resinous mass thus obtained was cooled and diluted with 400 grams of cresylic acid and 500 grams of "Solvesso 100." A yield of 2609 grams of solution containing 46.2% non-volatile matter was obtained. This illustrates the making of a polyester-amide-imide composition in accordance with this invention. In particular, this composition, referred to hereinafter for convenience as Composition C, differs from Composition A in that Composition C was made without the use of any triol.

A blend was made using 650 grams of Composition C and 779 grams of Composition B. This amounted, on a contained-solids basis, to the use of 50 parts by weight of each component. The resultant solution was diluted to a viscosity of 7.0 poises with 1:1 mixture of cresylic acid and "Solvesso 100." Coating of wire and testing was done as indicated in Example II. The results are presented below in Table I.

EXAMPLE IV

A compatibilizing-agent solution was prepared by dissolving 60.0 grams of the compound sold commercially under the designation "Mondur S" (the structure of this compound is indicated hereinabove) in 60 grams of cresylic acid. A blend was then prepared using 665 grams of Composition A, 702 grams of Composition C, and the 120 grams of the compatibilizing-agent solution mentioned above. On a contained-solids basis, this amounted to 45 parts by weight of polyester-amide-imide, 45 parts by weight of polyester, and 10 parts by weight of compatibilizing agent. The resultant blend was diluted, using a 1:1 mixture of cresylic acid and "Solvesso 100," to a viscosity of 6.1 poises at 27° C. Wire was then coated and tested as indicated in Example II, and the results of the tests are presented below in Table I.

EXAMPLE V

To 3-liter flask equipped with inert-gas sparger, motor stirrer, thermometer and air condenser, there were charged the following ingredients in the amounts indicated:

|  | Mols |
|---|---|
| 155.2 grams of ethylene glycol | 2.5 |
| 68.5 grams of trimellitic anhydride | 0.356 |
| 111.0 grams of isophthalic acid | 0.669 |
| 21.0 grams of tetraisopropyl titanate | 0.739 |

The reactants were heated rapidly to 160° C., and then slowly, at 15° C. per hour, to 220° C. There were then added 600 grams of cresylic acid and 331 grams of methylene dianiline (1.668 mols).

The reaction mixture was brought to temperature range of 175–185° C., and while the reaction mixture was maintained at such temperature, there were added slowly over a period of 1 hour 428.7 grams (2.23 mols) of trimellitic anhydride. Heating of the reaction was continued at 185–205° C. for 3 hours, a thread-forming state being reached, and an additional 70.2 grams of trimellitic anhydride (0.365 mol) and 98.2 grams of trimethylolpropane (0.730 mol) were added. The reaction mixture was then heated for an additional 5 hours at 190–210° C., a thread-forming stage again being reached. The reaction product was diluted with 800 grams of cresylic acid and 865 grams of "Solvesso 100." The yield was 3410 grams of solution at 33.6% solids. This represents the making of a polyester-amide-imide composition in accordance with the invention, and this composition will be referred to for convenience hereinafter as Composition D. Composition D differs from Compositions A and C in that the tall-oil fatty acids have been eliminated, and from Composition C in that a triol, trimethylolpropane, was used.

To a 5-liter, 4-necked reaction flask equipped with a motor stirrer, inert gas sparge tube, thermometer and steam condenser, there were charged the following ingredients in the amounts indicated:

|  | Mols |
|---|---|
| 338.2 grams of dimethyl terephthalate | 2.10 |
| 248.4 grams of ethylene glycol | 4.0 |
| 6.0 grams of tetraisopropyl titanate | 0.0211 |
| 50 grams of meta-para-cresol. | |
| 50.0 grams of xylene. | |

The ingredients were heated rapidly to 160° C., and then heated more slowly, at a rate of 15° C. per hour, to 200° C. Then 800 grams of cresylic acid were added, and the mixture was cooled to 60° C. Tolylene diisocyanate (696.4 grams, 4.0 mols) was dissolved in 864 grams of cresylic acid and then added rapidly to the reaction flask. Heating was continued for 1 hour at 125° C., and the reaction mixture was then diluted with 450 grams of cresylic acid and 390 grams of "Solvesso 100." The yield was 3609 grams of solution containing 36.2% non-volatiles. This composition will be designated for convenience hereinafter as Composition E. This represents the making of a novel compatibilizing-agent compound having the formula:

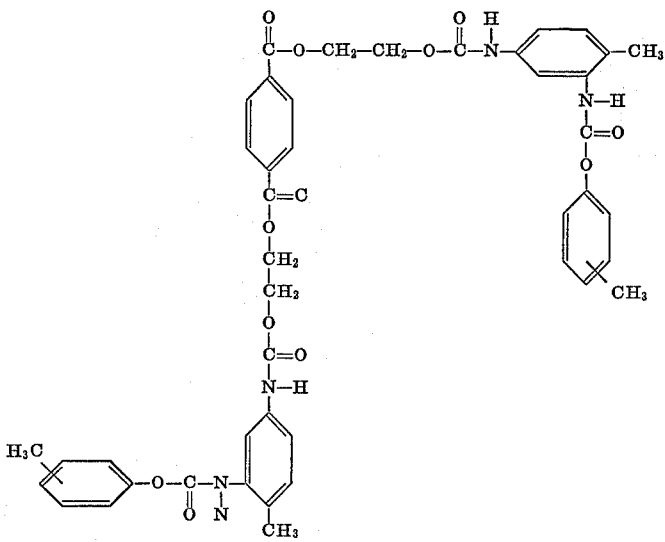

A blend was made by mixing 596 grams of Composition D, 553 grams of Composition E, and 520 grams of Composition B. On a contained-solids basis, this amounts to 33.3% each of polyester-amide-imide (Composition D), polyester (Composition B), and compatibilizing agent (Composition E). The resultant mixture was diluted with 144 grams of a 1:1 mixture of cresylic acid and "Solvesso 100" to a viscosity of 8.1 poises at 28° C. Coating on wire and testing was done as in Example II, the results are presented below in Table I.

EXAMPLE VI

To a 5-liter, 4-necked reaction flask equipped with a motor stirrer, nitrogen sparge tube, air condenser and thermometer, the following ingredients were charged in the amounts indicated:

|  | Mols |
|---|---|
| 310.4 grams of ethylene glycol | 5.0 |
| 137.0 grams of trimellitic anhydride | 0.712 |
| 222.0 grams of isophthalic acid | 1.338 |
| 42.0 grams of tetraisopropyl titanate | 0.148 |

The reactants were heated rapidly to 160° C., and then heated further at a rate of 15° C. per hour to a temperature of 220° C. Then 1200 grams of cresylic acid were added, along with 876.0 grams (4.42 mols) of methylene dianiline. Trimellitic anhydride (1066.0 grams, or 5.54 mols) was added slowly over a 1-hour period, with the reaction mixture being maintained at a temperature of 175–180° C. Heating was continued at 180–200° C. for 1.5 hours, with a ball-and-ring softening temperature of 75° C. being observed for the reaction mixture at the conclusion of that heating. Then, an additional 140.4 grams, or 0.730 mol of trimellitic anhydride were added, and the reaction was continued for 0.5 hour, at 195° C., with 196.4 grams of trimethylolpropane (1.46 mols) being then added. Heating was continued with 195–210° C. for an additional 2 hours, producing a reaction mixture having a ball-and-ring softening temperature at 85° C. The reaction mixture is then diluted with 1600 grams of cresylic acid and 1730 grams of "Solvesso 100." A yield was obtained of 69.10 grams of solution with a non-volatile content of 40.0%. This composition, hereinafter referred to for convenience as Composition F, represents the making of a polyester-amide-imide composition of somewhat higher-amide-imide content, tall-oil fatty acids not being used.

A blend was made by mixing 750 grams of Composition F, 467 grams of Composition B, and 331 grams of Composition E. On a contained-solids basis, this blend contained 50 parts by weight of the polyester-amide-imide, 30 parts by weight of the polyester, and 20 parts by weight of the compatibilizing agent. The resultant blend was diluted to a viscosity of 9.0 poises at 28° C. with the use of 237 grams of a 1:1 mixture of cresylic acid and "Solvesso 100." Wire was coated and tested as indicated by Example II. Results are listed below in Table I.

EXAMPLE VII

To a 3-liter, 4-necked flask equipped with a motor stirrer, nitrogen sparge tube, steam condenser, and thermometer, there were charged the following ingredients in the amounts indicated:

|  | Mols |
|---|---|
| 149.0 grams of ethylene glycol | 2.4 |
| 184.2 grams of glycerol | 2.0 |
| 776.0 grams of dimethyl terephthalate | 4.0 |
| 3.0 grams of tetraisopropyl titanate. |  |

The reaction mixture was heated rapidly to 160° C., and then at a slower rate, 15° C. per hour, to a temperature of 240° C. The condensation polymerization reaction advanced to a point where the reaction mixture was in a thread-forming stage. The reaction mixture was then diluted with 1200 grams of cresylic acid and 806 grams of "Solvesso 100." There was thus obtained a yield of 2870 grams of solution, having a non-volatile content of 28.1%. This composition will hereinafter be referred to for convenience as Composition G. It represents the making of a polyester composition differing from Composition B in that a substantial proportion of triol (glycerol) is used, and in that the acid component is supplied with the use of dimethyl terephthalate rather than trimellitic anhydride or isophthalic acid.

A blend was prepared by mixing 750 grams of Composition F, 641 grams of Composition G, and 332 grams of Composition E. On a contained-solids basis, this amounted to a blend of 50 parts of polyester-amide-imide, 30 parts of polyester, and 20 parts of compatibilizing agent. The resultant blend was diluted with 114 grams of 1:1 mixture of cresylic acid and "Solvesso 100" to obtain a solution with a viscosity of 7.0 poises at 26° C. This was used to coat wire as indicated in Example II. The test results are indicated below in Table I.

TABLE I
Properties of Wire Enamels on #18 American Wire Gage Wire (0.040″)—Heavy Build

| Example Number | Baking range [1] | Flexibility [2] | Abrasion resistance [3] | Heat shock [4] | Cut through, °C.[5] | Thermal life, hours at temp., °C.[6] Varnish | 250 | 225 | 200 | 175 |
|---|---|---|---|---|---|---|---|---|---|---|
| 1 | 17-40 | 30+ | 9-19 | 225-275 | 296 | None | 60 | 540 | 2,000 | >9,000 |
|  |  |  |  |  |  | Alkyd phenolic | 84 | 1,188 | >3,700 |  |
|  |  |  |  |  |  | Silicone | 72 | 480 | >3,700 |  |
|  |  |  |  |  |  | Isophthalate ester | 160 | 1,188 | >3,700 |  |
|  |  |  |  |  |  | Diphenyl oxide polymer | 96 | 732 | >3,700 |  |
| 2 | 17-36 | 30+ | 9-24 | 225-275 | 340 | None | 28 | 996 | >4,000 | >4,000 |
| 3 | 22-40 | 30+ | 6-19 | 250-275 | 221 | ...do... | 24 | 336 | >8,000 | >8,000 |
| 4 | 17-36 | 30+ | 9-19 | 225-275 | 221 | ...do... | 40 | 1,440 | 5,704 | >4,000 |
| 5 | 17-40 | 30+ | 7-29 | 175-275 | 290 | ...do... | 180 | 1,212 | >8,000 | >8,000 |
| 6 | 17-36 | 30+ | 18-52 | 225-275 | 290 | None | 60 | 1,128 | 5,208 | >8,500 |
|  |  |  |  |  |  | Alkyd phenolic | 396 | 1,440 | 2,856 | >8,700 |
|  |  |  |  |  |  | Epoxy | 180 | 792 | 2,020 | >9,000 |
| 7 | 17-40 | 5-30+ | 25-76 | 175-275 | 277 | None | 85 | 2,220 | >8,300 | >8,300 |
|  |  |  |  |  |  | Alkyd phenolic | 372 | 624 | 2,100 | >9,000 |

[1] Baking range is speed range (in feet per min. through a 15-foot tower at a hot-spot temperature of 400° C.), coating smoothly, passing 1X mandrel and passing quick snap test.
[2] Flexibility is range of maximum percent elongations which pass 1X mandrel over entire baking range.
[3] Abrasion resistance is number of strokes to failure, 16 mil diameter knife edge, 700 g. load.
[4] Heat shock—highest temperature (25° C. increments) at which 1X mandrel shows no cracks in one hour test.
[5] Cut through—crossed wires loaded with 100 g. weight and temperature increased at 5° C. per minute—120 volt failure circuit.
[6] Thermal Life—IEEE No. 57 procedure, 1,000 volt failure criterion on twisted pairs.

From the above Table I, it will seen that the wire-enamel formulations made in accordance with this invention exhibit an excellent combination of properties. Although in general about as good as the oil-modified acrylics in the other properties, they far surpass the oil-modified acrylic wire-enamel formulations in thermal life. The comparison with the other plain enamel compositions of low or modest cost, the oleoresinous and the synthetic oil-modified polyester compositions, is even more favorable.

While I have shown and described above certain embodiments of my invention, I intend to cover as well any change or modification therein which may be made without departing from its spirit and scope.

I claim as my invention:

1. A wire-enamel composition comprising a solution in a compatible solvent selected from the group consisting of phenol, the cresols, the xylenols and mixtures thereof, or a blend of (A) 20 to 70 parts by weight on a contained solids basis of a polyester-amide-imide material resulting from the reaction of (1) 40 to 52.5 equivalent percent of an organic acid material comprising 20 to 50 equivalent percent of trimellitic anhydride, 0 to 10 equivalent percent of unsaturated fatty acid containing 15 to 20 carbon atoms and 0 to 15 equivalent percent of isophthalic acid, $C_1$ to $C_5$ esters of isophthalic acid, terephthalic acid, $C_1$ to $C_5$ esters of terephthalic acid or mixtures thereof; (2) 15 to 30 equivalent percent of an organic amino material selected from methylene dianiline or mixtures of methylene dianiline with no more than an equivalent percent thereof of m-phenylenediamine, oxydianiline or melamine, (3) from 20 to 35 equivalent percent of a diol selected from the group consisting of ethylene glycol and $C_3$ to $C_5$ alpha-omega alkane diols, (4) up to 15 equivalent percent of triol selected from the group consisting of glycerol, tris-(2-hydroxyethyl)-isocyanurate and the trimethyloalkanes containing about 5 to 7 carbon atoms, the equivalent percent of (2), (3) and (4) minus the equivalent percent of (1) equalling between −5 and 20 percent;

(B) 80 to 20 parts by weight on a contained solids basis of a polyester material resulting from the reaction of (1) 40 to 55 equivalent percent of an organic acid material selected from the group consisting of trimellitic anhydride, trimellitic acid, $C_1$ to $C_5$ esters of trimellitic acid, isophthalic acid, $C_1$ to $C_5$ esters of isophthalic acid, terephthalic acid, $C_1$ to $C_5$ esters of terephthalic acid, and mixtures thereof, (2) 10 to 60 equivalent percent of ethylene glycol, $C_3$ to $C_5$ alpha-omega alkane diols, or mixtures thereof, (3) 0 to 50 equivalent percent of glycerol, trimethylolalkanes of about 5 to 7 carbon atoms or mixtures thereof, and (4) up to about 15 equivalent percent of tris-(2-hydroxyethyl)-isocyanurate; and (C) 0 to 40 parts by weight on a contained solids basis of a polyisocyanate organic compound compatibilizing agent having a molecular weight over 500 and having its reactive isocyanate groups end-blocked with a compound selected from the group consisting of phenol, the cresols, the xylenols, and mixtures thereof.

2. A composition as defined in claim 1, characterized in that said composition comprises 10 to 40 parts by weight on a contained solids basis of said compatibilizing agent.

3. A composition as defined in claim 2, characterized in that said compatibilizing agent is the reaction produce of 1 mol of trimethylolpropane with 3 mols of tolylene diisocyanate, end-blocked with three mols of phenol.

4. A composition as defined in claim 2, characterized in that said compatibilizing agent is the cyclic trimer of tolylene diisocyanate, end-blocked with m-cresol.

5. A composition as defined in claim 2, characterized in that said compatibilizing agent is an ester-linkage-containing compatibilizing agent having the formula

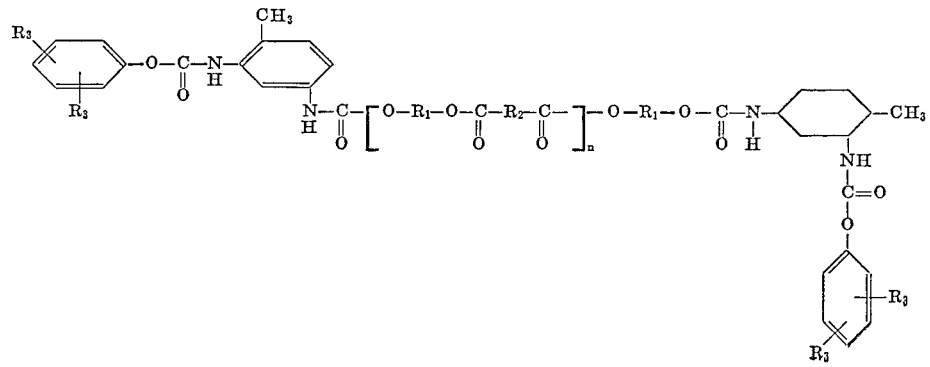

where
$n$ is an integer from 1 to 3,
$R_1$ is selected from the group consisting of

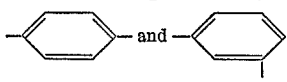

$R_2$ is selected from the group consisting of $CH_2-CH_2$, $CH_2-CH_2-CH_2$ and $CH_2-CH_2-CH_2-CH_2$, and
$R_3$ is selected from the group consisting of hydrogen and methyl.

6. A composition as defined in claim 1, characterized by the absence of tris-(2-hydroxyethyl)-isocyanurate.

7. An insulated electrical conductor comprising, in combination, a metal conductor and a cured, solid resinous insulation deposited on the conductor, the resinous insulation comprising the heat-reaction product of the soluble wire-enamel composition of claim 1.

8. A conductor as defined in claim 7, characterized in that said soluble wire-enamel composition is one made without the use of tris-(2-hydroxyethyl)-isocyanurate.

References Cited

UNITED STATES PATENTS

| | | | |
|---|---|---|---|
| 3,306,771 | 2/1967 | Schmidt et al. | 117—218 |
| 3,342,780 | 9/1967 | Meyer et al. | 260—75 |
| 3,425,866 | 2/1969 | Meyer et al. | 117—218 |
| 3,426,098 | 2/1969 | Meyer et al. | 260—841 |
| 3,428,486 | 2/1969 | George | 117—218 |

FOREIGN PATENTS

| | | | |
|---|---|---|---|
| 973,377 | 10/1964 | Great Britain | 117—232 |
| 996,649 | 6/1965 | Great Britain | 117—232 |

DONALD E. CZAJA, Primary Examiner
R. W. GRIFFIN, Assistant Examiner

U.S. Cl. X.R.

117—128.4, 161 K, 232, DIG 7; 260—22 TN, 33.4 R, 33.4 UR, 33.6 R, 33.6 UB, 858, 860